United States Patent
Summers et al.

(10) Patent No.: US 10,243,389 B2
(45) Date of Patent: Mar. 26, 2019

(54) SYSTEMS AND METHODS FOR NEAR RESONANT WIRELESS POWER AND DATA TRANSFER

(71) Applicant: GOODRICH CORPORATION, Charlotte, NC (US)

(72) Inventors: Paul L. Summers, Troy, OH (US); Perry Leaves, Springboro, OH (US); Eric Stein, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 307 days.

(21) Appl. No.: 14/671,891

(22) Filed: Mar. 27, 2015

(65) Prior Publication Data
US 2016/0285300 A1    Sep. 29, 2016

(51) Int. Cl.
| | |
|---|---|
| H02J 7/02 | (2016.01) |
| H02J 50/12 | (2016.01) |
| H02J 50/80 | (2016.01) |
| H02J 7/06 | (2006.01) |
| H02J 7/00 | (2006.01) |
| H02J 7/10 | (2006.01) |

(52) U.S. Cl.
CPC .......... *H02J 7/025* (2013.01); *H02J 7/06* (2013.01); *H02J 50/12* (2016.02); *H02J 50/80* (2016.02); *H02J 2007/0096* (2013.01); *H02J 2007/10* (2013.01)

(58) Field of Classification Search
CPC . H01F 38/14; H02J 5/005; H02J 7/025; H02J 17/00; H02J 50/10; H02J 50/12; H02J 50/80; H02J 2007/0096; H04B 5/0031; H04B 5/0037; H04B 5/0075
USPC ........................................................ 307/104
See application file for complete search history.

(56) References Cited

U.S. PATENT DOCUMENTS

| | | | |
|---|---|---|---|
| 8,922,066 B2 * | 12/2014 | Kesler ................ | B60L 11/1812 307/104 |
| 9,852,843 B2 * | 12/2017 | Davis ...................... | H01F 38/14 |

(Continued)

FOREIGN PATENT DOCUMENTS

JP     5526833     6/2014

OTHER PUBLICATIONS

Extended European Search Report dated Aug. 4, 2016 in European Application No. 16162328.5.

*Primary Examiner* — Levi Gannon
(74) *Attorney, Agent, or Firm* — Snell & Wilmer L.L.P.

(57) ABSTRACT

A distributed sensing system is provided. The system may have a primary portion and a distributed sensing portion separated by an air gap. The primary portion and the distributed sensing portion may be inductively coupled by a transformer having a primary coil and a secondary coil. A controller may direct a power supply to drive the primary coil with a driving waveform. The controller may vary a frequency of the driving waveform to substantially equal a resonant frequency of the transformer. The controller may monitor the power transfer between the primary coil and the secondary coil and may vary the frequency of the driving waveform in response. In this manner, the amount of power transferred from the primary coil to the secondary coil may be optimized in response to the controller substantially matching the driving waveform to the resonant frequency of the transformer.

12 Claims, 6 Drawing Sheets

(56) References Cited

U.S. PATENT DOCUMENTS

| | | | |
|---|---|---|---|
| 2010/0070219 A1* | 3/2010 | Azancot | H02J 5/005 |
| | | | 702/62 |
| 2010/0219695 A1* | 9/2010 | Komiyama | H01Q 9/04 |
| | | | 307/104 |
| 2012/0049648 A1* | 3/2012 | Choi | H02J 5/005 |
| | | | 307/104 |
| 2012/0063505 A1* | 3/2012 | Okamura | H04B 5/0006 |
| | | | 375/238 |
| 2012/0112555 A1 | 5/2012 | Toshimitsu et al. | |
| 2013/0033117 A1 | 2/2013 | Kim et al. | |
| 2013/0249306 A1* | 9/2013 | Kim | H02J 17/00 |
| | | | 307/104 |
| 2014/0133496 A1* | 5/2014 | Sugiura | H04L 12/413 |
| | | | 370/445 |
| 2014/0203657 A1* | 7/2014 | Song | H02J 50/12 |
| | | | 307/104 |
| 2014/0333128 A1* | 11/2014 | Ichikawa | H02J 7/025 |
| | | | 307/9.1 |
| 2015/0042169 A1* | 2/2015 | Park | B60L 11/182 |
| | | | 307/104 |
| 2015/0243442 A1* | 8/2015 | Kanno | H01G 7/06 |
| | | | 307/104 |
| 2015/0364923 A1* | 12/2015 | Fine | H02J 5/005 |
| | | | 307/31 |
| 2015/0377741 A1* | 12/2015 | Stein | G01M 17/02 |
| | | | 307/9.1 |

\* cited by examiner

SYSTEMS AND METHODS FOR NEAR RESONANT WIRELESS POWER AND DATA TRANSFER

FIELD

The present disclosure relates to an inductively coupled distributed sensing system, and more specifically, to a system and method for maintaining a driving waveform at a resonant frequency of an inductively coupled channel.

BACKGROUND

The control unit and/or power source of a distributed sensing system may be located a significant distance from a remote sensor. As such, typical systems may require a significant mass of wiring across the entire distributed system. Typically, one set of wires is used to transmit and/or distribute power (to a sensor), and receive back output-data (from the sensor) over another set of wires.

SUMMARY

A method of power transfer efficiency optimization is disclosed. The method may include exciting a primary coil of a transformer with a driving waveform including an alternating current, coupling, by the transformer, the alternating current to a secondary coil in response to the exciting, and monitoring, by an effectivity monitor, at least one of the alternating current coupled to the secondary coil and a load on the primary coil. The method may also include communicating, by the effectivity monitor, data representative of a magnitude of at least one of the alternating current and the load to a controller, directing, by the controller, a power supply to change a frequency of the driving waveform in response to the data, and maximizing, by the controller, at least one of the alternating current coupled to the secondary coil and the load on the primary coil in response to the directing.

A distributed sensing system is disclosed. The system may include a primary portion and a distributed sensing portion. The primary portion may include a power supply configured to generate a carrier of a driving waveform, a transmitter configured to generate a modulation of the driving waveform, and a controller configured to set a frequency of the carrier of the driving waveform. The primary portion may further include a primary coil including a resonant circuit in electrical connection to the transmitter and the controller and configured to receive the driving waveform and generate an electromagnetic field. The distributed sensing portion may include a sensor capable of monitoring a parameter and a secondary coil including a resonant circuit in electrical connection to the sensor and configured to be connected in inductive communication to the primary coil by the electromagnetic field. The controller may set the frequency of the carrier of the driving waveform in correspondence to a resonant frequency of at least one of the primary coil and the secondary coil.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
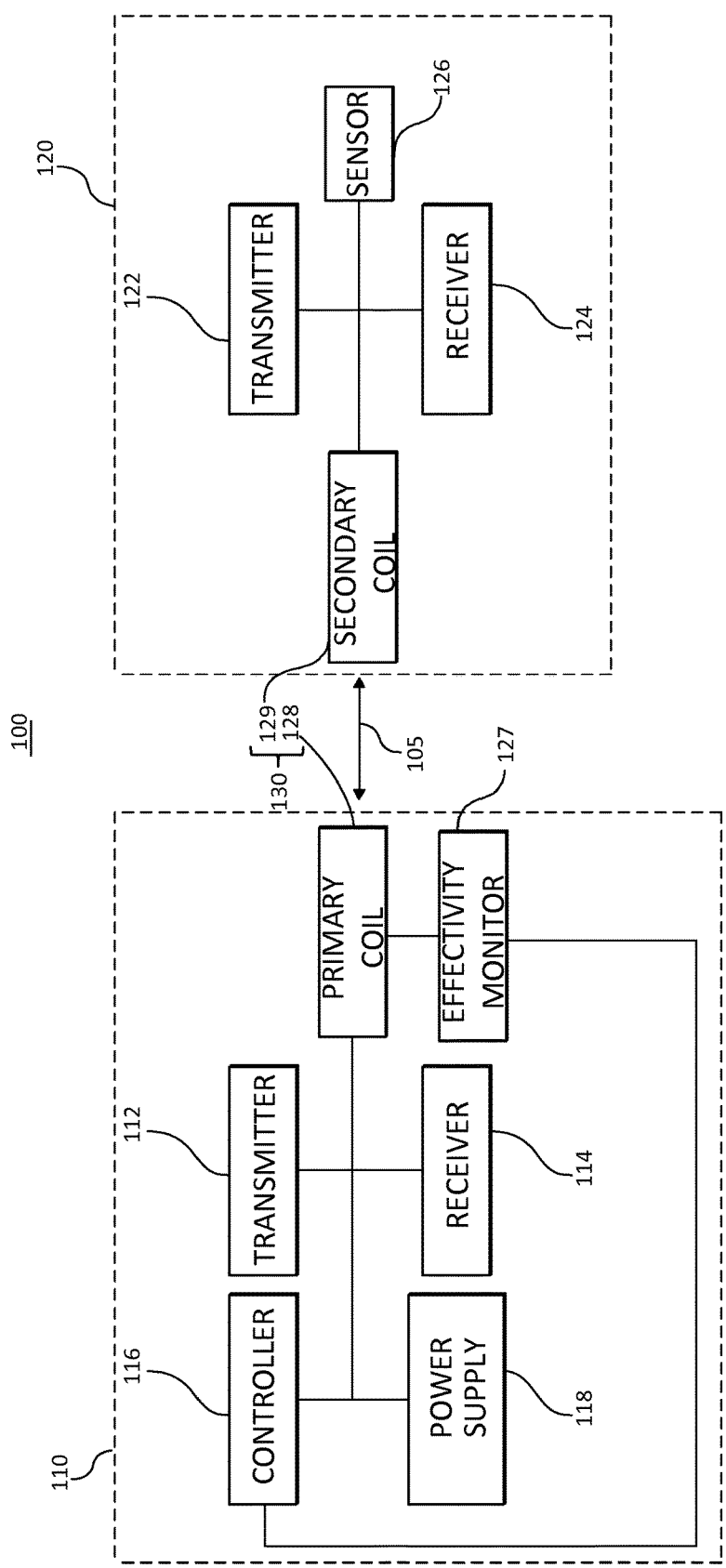
FIG. 1A is a block diagram of a distributed sensing system having an effectivity monitor connected to a primary coil, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

In various embodiments, systems with distributed sensing capabilities may employ a signal monitoring system that allows for power and data to be communicated over the same power distribution path by inductive communication. By employing this type of system, communication among parts experiencing relative mechanical movement may be effectuated. Such a wireless power and data transfer may involve the inductive coupling of components associated with each of the parts experiencing relative mechanical movement. One or more resonant circuits having a primary coil and a secondary coil may be excited at or near a resonant frequency. Typically, the efficiency of energy transfer between the primary coil and the secondary coil is enhanced when the resonant circuit is excited at or near its resonant frequency. When the resonant circuit is at or near resonance, the flow of electrical current through the system is maximized and thus the size and/or flux of the generated magnetic field tends to be maximized, thus tending to maximize the rate of energy transfer from the primary coil to the secondary coil. However, variations in circuit components, as well as wear over time and the replacement of parts during maintenance, may cause changes in the resonant frequency of the resonant circuit. Various systems and methods to address these challenges are presented herein. For instance, the frequency of the driving waveform may be adjusted to optimize the efficiency of the power transfer. This adjustment may occur substantially continuously, or periodically, or in response to periodic control or test routines.

Various embodiments include an aircraft tire pressure monitoring system (TPMS). The TPMS involves the wireless transmission of power and data across an axle-hubcap air gap. Coupled inductors electromagnetically interact across the gap and are implemented in resonant circuits. In a resonant circuit, component value variations, such as a typical 10% tolerance for components, may cause variations in the resonant frequency of various parts. For instance, an example resonant circuit may have a nominal resonance of 230 kHz but this nominal resonance may vary by, for example, 31 kHz in response to an 11% tolerance on capacitor values and a 1% tolerance on inductor values within the resonant circuit.

Furthermore, giving consideration to the mutual inductance between the resonant circuit associated with the primary coil and the resonant circuit associated with the secondary coil, the variance from the nominal resonant frequency increases further. Furthermore, in various embodiments, the coupling coefficient between the two resonant circuits may be between 0.2 and 0.8, such as due to mechanical load and tolerance variations. In such embodiments, the variance from nominal resonant frequency may be, for example, 166 kHz, a significant deviation particularly in view of, for example, a nominal resonant frequency of 230 KHz. Still furthermore, the coupling coefficient between the two resonant circuits may vary rapidly such as due to mechanical shifting, vibration, and the like of the components.

Accordingly, a driving waveform may be output, such as from a waveform generator integrated circuit ("IC") under microprocessor control, to drive a resonant circuit at or near resonance. A sensing apparatus may evaluate current, voltage, and/or other parameters of the resonant circuit (such as with a current sensing resistor) and may vary the driving waveform in response. For instance, the current, voltage, and/or other parameters of the resonant circuit may change depending on how close the frequency of the driving waveform is to the resonant frequency of the resonant circuit(s). The microprocessor may sense these values, such as during nominal operations, and/or such as during an alternating current ("AC") frequency sweep of the resonant circuit(s) whereby the microprocessor may determine the instantaneous resonant frequency of the resonant circuit(s) and adapt the frequency of the driving waveform accordingly. Generally, the resonant circuit(s) exhibit minimized impedance, maximized power transmitted, maximized signal-to-noise ratio, and/or show other optimized resonant circuit(s) parameters when driven at or near the resonant frequency.

Various embodiments comprise a mechanically static portion and a mechanically non-static portion. This arrangement may include the static portion inductively coupled to the non-static portion. Various embodiments may employ one or more coils inductively coupled across a dielectric gap (e.g., wirelessly coupled across an air and/or vacuum space). These coils may comprise a transformer having a primary portion and a secondary portion, each comprising a coil and resonant circuit on corresponding sides of the wireless gap. For example, the primary portion may be mounted to the static portion and the secondary portion may be mounted to the non-static portion. In various embodiments, both the mechanically static portion and the mechanically non-static portion are moving but with differential movement relative to one another. In further embodiments, both portions are mechanically static relative to one another.

In various embodiments, the systems described herein may be used in various systems and applications including, for example, down-hole drilling, military applications, construction applications, transportation applications and/or the like. While described in the context of aircraft applications, and more specifically, in the context of tire pressure monitoring, the various embodiments of the present disclosure may be applied to any suitable application.

In various embodiments and with reference to FIGS. 1A and 1B, a distributed sensing system 100 (hereinafter "system 100") may be any suitable system that is configured to and/or capable of providing power and communicating data over the same channel (e.g., a primary coil 128 and secondary coil 129 of a transformer 130 separated by a dielectric gap). System 100 may comprise a primary portion 110. System 100 may also comprise a distributed sensing portion 120.

In various embodiments, primary portion 110 may comprise a controller 116 and a power supply 118. Controller 116 may be configured to send and receive data to distributed sensing portion 120 via transformer 130 and to control the power supply 118, transmitter 112, and receiver 114. Power supply 118 may be configured to provide power to distributed sensing portion 120 via transformer 130, such as by providing a carrier of a driving waveform. Primary portion 110 may also comprise a transmitter 112, a receiver 114 and/or a transceiver that is configured to transmit and receive power and/or data. For example, transmitter 112 may be configured to provide a modulation of a driving waveform. Distributed sensing portion 120 may comprise a sensor 126 configured to monitor any suitable parameter, for example, tire pressure, temperature, wheel speed, acceleration, and the like. Sensor 126 may communicate sensed data to the secondary coil 129, whereby the sensed data is communicated to the controller 116 by the primary coil 128 connected in inductive communication to the secondary coil 129. Distributed sensing portion 120 may also comprise a transmitter 122, a receiver 124, and/or a transceiver that is configured to send and receive power and/or data with primary portion 110 via transformer 130.

In various embodiments, primary portion 110 may be in electronic communication with distributed sensing portion 120. Primary portion 110 may not be physically coupled and/or may not be wired to distributed sensing portion 120. In this regard, primary portion 110 and distributed sensing portion 120 may be inductively coupled to one another. Primary portion 110 may be configured to transmit power and/or data wirelessly via communication 105 to distributed sensing portion 120. Primary portion 110 may employ an inductive power and data transfer system enabling data communication and power transfer between primary portion 110 and distributed sensing portion 120. For example, system 100 may comprise a transformer 130. Transformer 130 may comprise a primary coil 128 and a secondary coil 129. A primary coil 128 may comprise a magnetic field inducing apparatus, such a coil of wire and/or a resonant circuit, such as a parallel inductor-capacitor (parallel LC) circuit, or a parallel resistor-inductor-capacitor (parallel RLC) circuit, or a series inductor-capacitor (series LC)

circuit, or a series resistor-inductor-capacitor (series RLC) circuit, and/or the like. In various embodiments, the coil of wire and the inductor are the same component. Primary coil 128 may receive data and power from transmitter 112 and power supply 118 and may couple this data and power via a magnetic field to a distributed sensing portion 120, and more specifically, a secondary coil 129. Thus, the primary coil 128 of the transformer 130 may be coupled in electrical (e.g., wired) communication with the primary portion 110 and inductive communication with the distributed sensing portion 120, whereas the secondary coil 129 of the transformer 130 may be coupled in electrical (e.g., wired) communication with the distributed sensing portion 120 and inductive communication with the primary portion 110. As such, the primary portion 110 and distributed sensing portion 120 may be in inductive communication with one another and yet may be separated by a dielectric gap.

In various embodiments, distributed sensing portion 120 may be in electronic communication with primary portion 110. Distributed sensing portion 120 may be configured to receive power and/or data wirelessly via communication 105 from primary portion 110 and may be configured to transmit data wirelessly via communication 105 to primary portion 110. For example, as mentioned, system 100 may comprise a transformer 130. Transformer 130 may comprise a primary coil 128 and a secondary coil 129. A secondary coil 129 may comprise a magnetic field inducing apparatus, such as an coil of wire and/or a resonant circuit, such as a parallel inductor-capacitor (parallel LC) circuit, or a parallel resistor-inductor-capacitor (parallel RLC) circuit, or a series inductor-capacitor (series LC) circuit, or a series resistor-inductor-capacitor (series RLC) circuit, and/or the like. In various embodiments, the coil of wire and the inductor are the same component. Secondary coil 129 may receive data from transmitter 112 and may couple this data via a magnetic field to a primary portion 110, and more specifically, a primary coil 128. Secondary coil may receive data and/or power from the primary coil 128 and distribute this data and/or power to transmitter 122, receiver 124, and/or sensor 126.

Figure 1B:
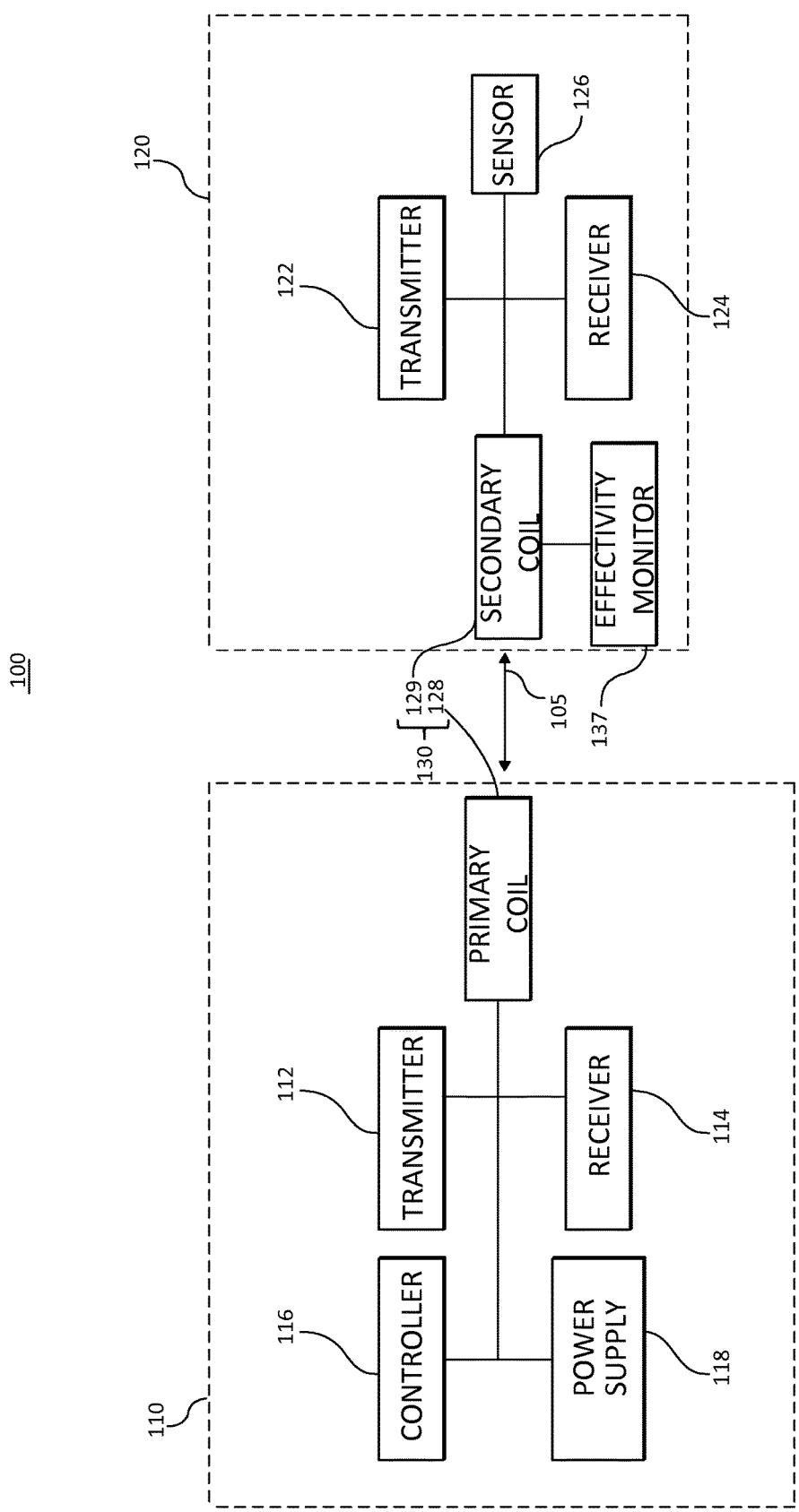
FIG. 1B is a block diagram of a distributed sensing system having an effectivity monitor connected to a secondary coil, in accordance with various embodiments.

With specific reference to FIG. 1A, in various embodiments, primary portion 110 may further comprise an effectivity monitor 127 and with specific reference to FIG. 1B, in various embodiments, distributed sensing portion 120 may further comprise an effectivity monitor 137. In further embodiments, a system 100 may comprise both an effectivity monitor 127 and an effectivity monitor 137.

The transmitter 112 and receiver 114 may be inductively coupled to distributed sensing portion 120 by transformer 130. An effectivity monitor 127 may evaluate the efficiency of this coupling, for example determining the portion of the energy in the primary coil 128 coupled to the secondary coil 129 relative to the total energy in the primary coil 128. In various embodiments, the effectivity monitor 127 may evaluate the efficiency of this coupling, by determining the current flowing through the primary coil 128 and/or the secondary coil 129.

Similarly, the transmitter 122 and receiver 124 may be inductively coupled to primary portion 110 by transformer 130. An effectivity monitor 137 may evaluate the efficiency of this coupling, for example determining the magnitude of the energy in the secondary coil 129. Transmitter 122 may communicate data representative of this magnitude via communication 105 to controller 116.

In various embodiments, effectivity monitor 127 comprises a load sensor. For instance, the effectivity monitor 127 may evaluate the load on the primary coil 128 (e.g., the current drawn by the primary coil 128 from the transmitter 112 and/or power supply 118). Generally, the current drawn will peak at the point of optimized power transmission of the coupling. In general, such peak corresponds to the frequency of the driving waveform that is exciting the primary coil 128 substantially equaling the resonant frequency of the transformer 130. In various embodiments, the effectivity monitor 127 comprises a current sense resistor disposed in series with at least a portion of the primary coil 128, such as an inductor and/or capacitor. A potential difference may be induced across the terminals of the sense resistor in response to the magnitude of the current flowing through the sense resistor. The controller 116 may be in electronic communication with the effectivity monitor 127, such as a sense resistor, and may determine and/or store data representative of the magnitude of the current flowing through the sense resistor.

In various embodiments, effectivity monitor 137 comprises a current and/or voltage sensor. For instance, the effectivity monitor 137 may evaluate the current flowing and/or voltage across the secondary coil 129. Generally, the current and/or voltage will peak at the point of optimized efficiency of the coupling. In general, such peak corresponds to the frequency of the driving waveform exciting the primary coil 128 substantially equaling the resonant frequency of the transformer 130. In various embodiments, the effectivity monitor 137 comprises a sense resistor disposed in series with at least a portion of the secondary coil 129, such as an inductor and/or capacitor. A potential difference may be induced across the terminals of the sense resistor in response to the magnitude of the current flowing through the sense resistor. The controller 116 may be in communication with the effectivity monitor 137, such as a sense resistor via transmitter 122 and communication 105. The controller 116 may determine and/or store data representative of the magnitude of the current flowing through and/or voltage across a portion of the secondary coil 129 as determined by the sense resistor.

Figure 2A:
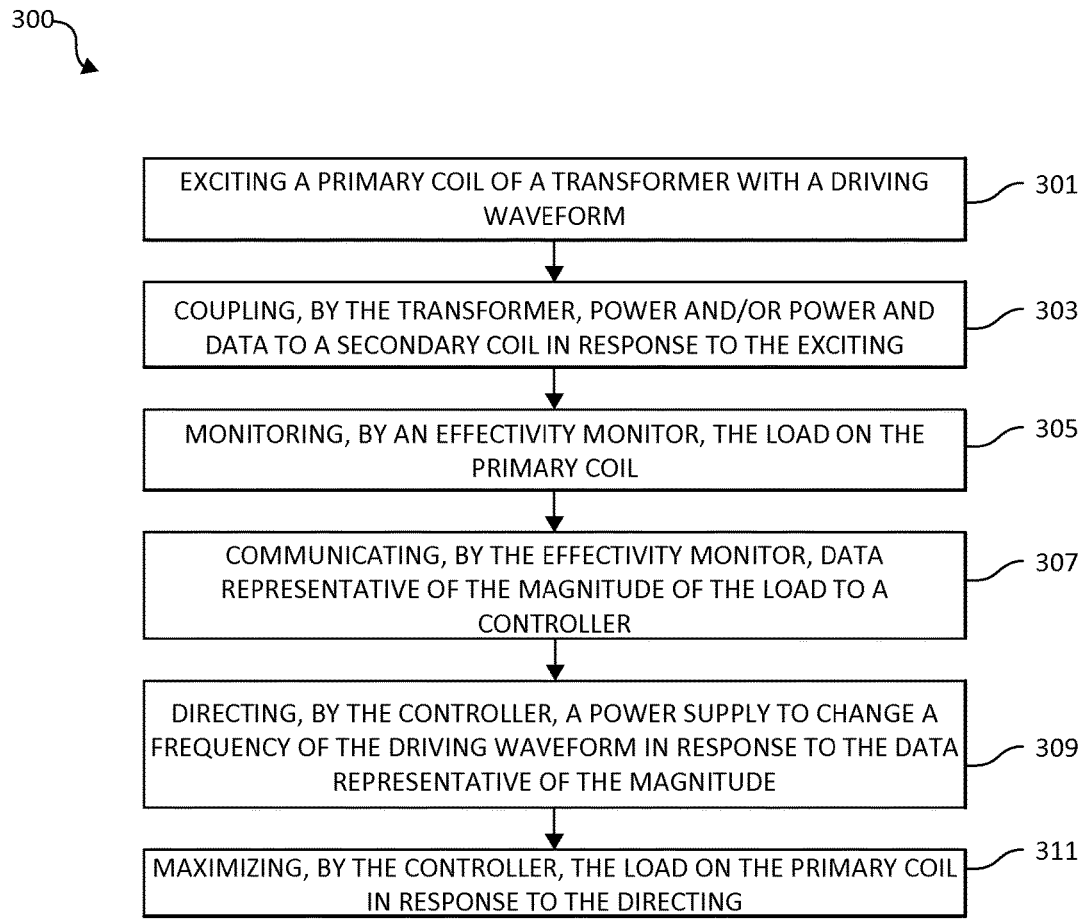
FIG. 2A illustrates a method for operating a distributed sensing system having an effectivity monitor connected to a primary coil, in accordance with various embodiments.

With reference to FIGS. 1A and 2A a distributed sensing system 100 may be configured to perform a power transfer efficiency optimization method 300. The power transfer efficiency optimization method 300 may include exciting a primary coil 128 with a driving waveform comprising power (Step 301). For instance, a transmitter 112 and/or a power supply 118 may excite the primary coil 128 with a driving waveform having a carrier generated by the power supply 118 and modulation generated by the transmitter 112. Subsequently, the driving waveform may cause power and/or power and data to be coupled to a secondary coil 129 in response to the exciting (Step 303). For instance, power and/or power and data may be coupled by transformer 130 from the primary coil 128 to a secondary coil 129 via communication 105. The method may include monitoring the load on the primary coil 128 by an effectivity monitor 127 (Step 305). For instance, an effectivity monitor 127, such as a sense resistor, in communication with a controller 116, may determine the load on the primary coil 128 (and/or another desired parameter) by measuring a current and/or voltage and/or phase relationship between current and voltage of the driving waveform through/across a portion of the primary coil 128. Subsequently, the effectivity monitor 127 may communicate data representative of the magnitude of this power to the controller 116 (Step 307). The method may include directing, by the controller 116, the power supply 118 to change the frequency or amplitude of the driving waveform in response to the data (Step 309). For instance, controller 116 may direct the transmitter 112 and/or power supply 118 to at least one of increase or decrease (collectively, "change") the frequency or amplitude of the driving waveform. The controller 116 may optimize the load on the primary coil 128 in response to the directing (Step 311). The controller 116 may reevaluate the load on the primary coil 128. For instance, the controller 116 may reevaluate the received data representative of the current and/or voltage through/across a portion of the primary coil 128. The controller 116 may cease to change the frequency of the driving waveform of the primary coil 128 in response to the effectivity monitor 127 indicating that the load on the primary coil 128 is maximized. In this manner, the frequency of the driving waveform may be substantially matched to the resonant frequency of the transformer 130 whereby the power transfer efficiency is optimized. In further embodiments, the controller 116 may at various points further change the frequency of the driving waveform such as to detune the driving frequency a specified amount away from the resonant frequency of the transformer 130, to optimize other aspects, such as to limit effective radiated power susceptible to eavesdropping and/or the like.

Figure 2B:
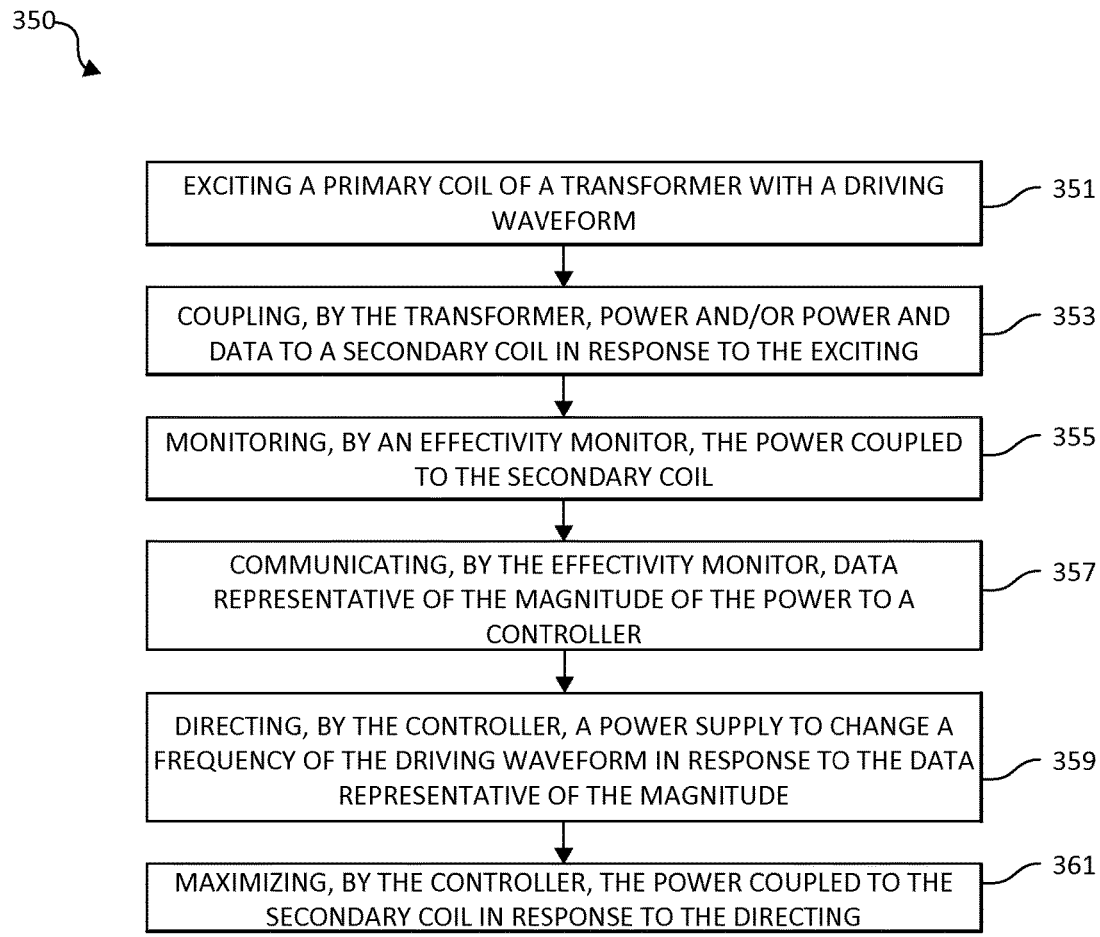
FIG. 2B illustrates a method for operating a distributed sensing system having an effectivity monitor connected to a secondary coil, in accordance with various embodiments.

With reference now to FIG. 2B, a distributed sensing system 100 may be configured to perform a power transfer efficiency optimization method 350. With reference to FIGS. 1B and 2B, a power transfer efficiency optimization method 350 may include exciting a primary coil 128 with a driving waveform (Step 351). For instance, a transmitter 112 and/or a power supply 118 may excite the primary coil 128 with a driving waveform having a carrier generated by the power supply 118 and modulation generated by the transmitter 112. Subsequently, the driving waveform may cause power and/or power and data to be coupled to a secondary coil 129 in response to the exciting (Step 353). For instance, power and/or power and data may be coupled by transformer 130 from the primary coil 128 to a secondary coil 129 via communication 105. The method may include monitoring the power coupled to the secondary coil 129 by an effectivity monitor 137 (Step 355). For instance, an effectivity monitor 137, such as a sense resistor, in communication with a transmitter 122, may determine the energy coupled to the secondary coil 129 (and/or another desired parameter) by measuring a current and/or voltage and/or phase relationship between current and voltage through/across a portion of the secondary coil 129. Subsequently, the effectivity monitor 137 may communicate data representative of the magnitude of this power to the controller 116 (Step 357). For instance, the transmitter 122 may communicate data representative of the magnitude of this energy via communication 105 to or from effectivity monitor 137 to controller 116. The method may include directing, by the controller 116, the power supply 118 to change the frequency of the driving waveform in response to the data (Step 359). For instance, controller 116 may direct the transmitter 112 and/or power supply 118 to at least one of increase or decrease (collectively, "change") the frequency of the driving waveform of the primary coil 128. The system 100 may maximize the power coupled to the secondary coil 129 in response to the directing (Step 361). For instance, the controller 116 may reevaluate the received data representative of the current and/or voltage through/across a portion of the secondary coil 129. The controller 116 may cease to change the frequency of the driving waveform in response to the effectivity monitor 137, indicating that the current and/or voltage through/across a portion of the secondary coil 129 is maximized. Stated differently, the system 100 may maximize at least one of the power coupled to the secondary coil 129 (e.g. current through the portion of the secondary coil 129 and the voltage across the portion of the secondary coil 129) in response to the changing. In this manner, the frequency of the driving waveform may be substantially matched to the resonant frequency of the transformer 130 whereby the power transfer efficiency is optimized. In further embodiments, the controller 116 may at various points further change the frequency of the driving waveform such as to detune the driving frequency a specified amount away from the resonant frequency of the transformer 130, to optimize other aspects, such as to limit effective radiated power susceptible to eavesdropping and/or the like.

In various embodiments, power transfer efficiency optimization method 300 and/or power transfer efficiency optimization method 350 is triggered by various events. For instance, with reference to FIGS. 1A-3B, controller 116 may trigger power transfer efficiency optimization method 300 and/or power transfer efficiency optimization method 350 in response to a change of stage of flight, for instance engine start, taxi, run-up, take off, gear up, climb, cruise, descent, gear down, touch down, roll out, taxi, engine stop, and/or the like. In further embodiments, controller 116 may trigger power transfer efficiency optimization method 300 and/or power transfer efficiency optimization method 350 in response to an initial start-up event and/or in response to a maintenance action, such as the replacement of a landing gear component such as a wheel, tire, and/or hub. Moreover, in further embodiments, controller 116 may trigger power transfer efficiency optimization method 300 and/or power transfer efficiency optimization method 350 in response to an error message from a distributed sensing portion 120, such as indicating inadequate power. In still further embodiments, controller 116 may trigger power transfer efficiency optimization method 300 and/or power transfer efficiency optimization method 350 iteratively and/or substantially continuously and/or in response to an interrupt, such as a received message transmitted via communication 105.

Figure 3A:
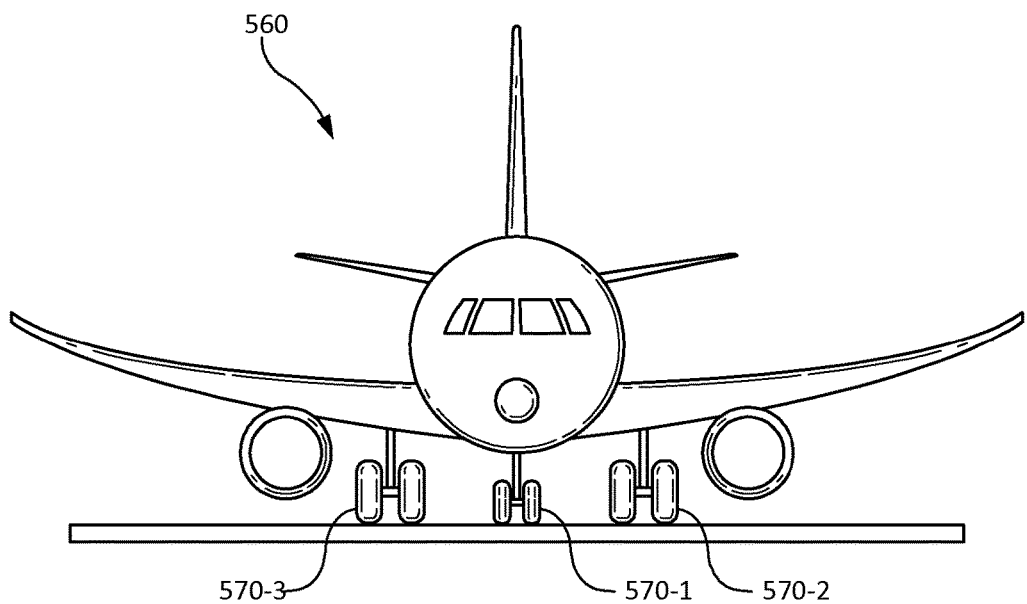
FIG. 3A illustrates a front view of an aircraft with deployed landing gear, in accordance with various embodiments.
Figure 3B:
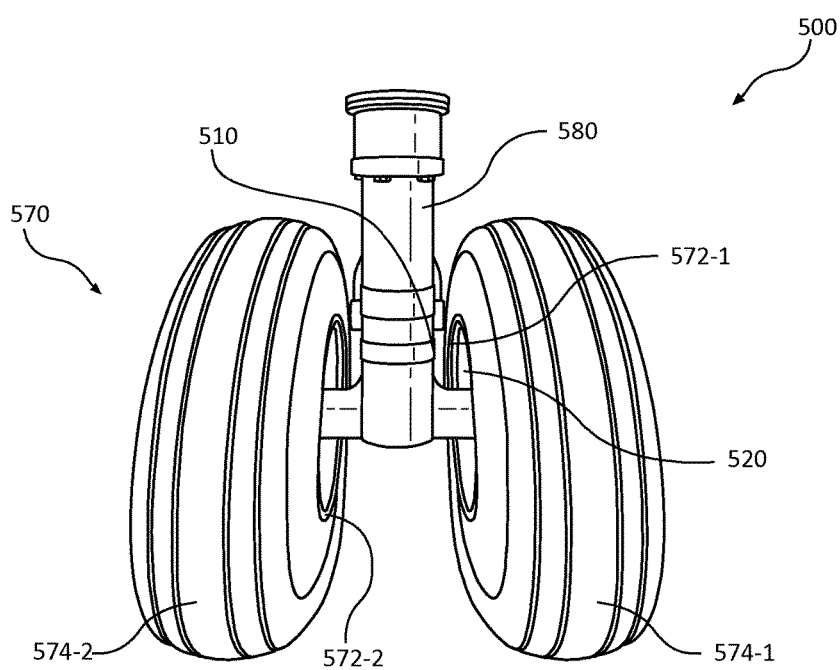
FIG. 3B illustrates a front view of a landing gear, in accordance with various embodiments.

Moreover, in various embodiments and with reference to FIGS. 3A-3B, system 500 may include the components and capabilities of distributed sensing system 100, as shown in FIG. 1A and FIG. 1B, and as described herein, and power transfer efficiency optimization method 300 as shown in FIG. 2A and power transfer efficiency optimization method 350, as shown in FIG. 2B. Moreover, system 500 may be implemented on an aircraft 560 as a wheel or tire monitoring system 500 (hereinafter, "monitoring system 500"). The monitoring system 500 may be configured to monitor parameters associated with wheel 572-1 and/or wheel 572-2 or tire 574-1 and/or tire 574-2 and/or a brake and/or an axle.

In various embodiments, monitoring system 500 may be installed on one or more landing gear including, for example, landing gear 570-1, landing gear 570-2, and landing gear 570-3 in FIG. 3A and landing gear 570. Landing gear 570-1, landing gear 570-2, and landing gear 570-3 may generally support the aircraft when it is not flying, allowing it to take off, land, and taxi without damage.

In various embodiments and with specific reference to FIG. 3B, landing gear 570 may comprise wheel 572-1 and wheel 572-2. Wheel 572-1 and wheel 572-2 may be coupled to landing gear strut 580. Wheel 572-1 may be operatively coupled to a tire 574-1. In this regard, tire 574-1 may be mounted on wheel 572-1. Tire 574-1 may define a pressurizable chamber between tire 574-1 and wheel 572-1. Similarly, a tire 574-2 may be mounted on and/or coupled to wheel 572-2.

In various embodiments, it may be desirable to monitor tire pressure for tire 574-1 and/or tire 574-2 (e.g., the pressure inside the chamber defined between tire 574-1 and wheel 572-1 and/or tire 574-2 and wheel 572-2). In this regard, distributed sensing portion 520 of monitoring system 500 may be installed on wheel 572-1 and/or wheel 572-2. Primary portion of monitoring system 500 may be installed in relatively close proximity to distributed sensing portion 520. In this installation application, distributed sensing portion 520 may be installed on a rotating component (e.g., wheel 572-1 or wheel 572-2) and primary portion 510 may be installed on a stationary structure (e.g., landing gear strut 580).

In various embodiments, monitoring system 500 may be capable of being read during an on-ground inspection (e.g., a pilot walk around). In this regard, monitoring system 500 may be read with an "interrogating device" (e.g., a detector, a smart phone, and/or the like). Monitoring system 500 may also comprise a suitable indicator (e.g., a visual indicator, an audio indicator, an infrared indicator, and/or the like).

In various embodiments, monitoring system 500 may be in further communication with a brake control unit or other suitable controller. In this regard, data from monitoring system 500 may be analyzed to provide an indication of a tire condition such as, for example, tire pressure, tire temperature, and/or the like. For example, monitoring system 500 and/or the brake control unit may cause a cockpit light to be illuminated in response to a tire pressure condition being below a threshold and/or cause a scalar and/or vector value to be displayed on a cockpit display in response to a determination of a tire pressure. Moreover, monitoring system 500 and/or the brake control unit may be capable of transmitting and/or displaying a sensed pressure in the cockpit. In various embodiments, controller 116 comprises a portion of a brake control unit.

In various embodiments, tire pressure may be checked as part of aircraft maintenance activities. This check may include, for example, a visual inspection and an evaluation of tire pressure based on a tire pressure reading from monitoring system 500. The monitoring system 500 and/or the brake control unit may be capable of alerting a crew member to a low tire pressure condition in response to a flight event (e.g., a taxi, takeoff, and/or landing). For example, monitoring system 500 and/or the brake control unit may also be capable of measuring tire pressure and/or indicating low tire pressure in flight and/or prior to a landing event.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of monitoring tire pressure of an aircraft, the method comprising:
    exciting a primary coil of a transformer with a driving waveform comprising an alternating current, wherein the primary coil is mounted to a non-rotating structure of the aircraft;
    coupling, by the transformer, the alternating current to a secondary coil in response to the exciting, wherein the secondary coil is mounted to a wheel of the aircraft, wherein a distance between the primary coil and the secondary coil varies in response to at least one of mechanical load, mechanical shifting, and mechanical vibrations relative to one or both of the non-rotating structure and the wheel;
    monitoring, by an effectivity monitor physically and electrically coupled to the secondary coil, an efficiency of a coupling between the primary coil and the secondary coil;
    communicating, by the effectivity monitor, data representative of a magnitude of at least one of the alternating current and a load to a controller;
    directing, by the controller, a power supply to change a frequency of the driving waveform in response to the data;
    maximizing, by the controller, at least one of the alternating current coupled to the secondary coil and the load on the primary coil in response to the directing.

2. The method of claim 1, wherein the effectivity monitor comprises a sense resistor connected in physical electrical communication to the secondary coil.

3. The method of claim 1, wherein the primary coil comprises a parallel inductor-capacitor (LC) circuit.

4. The method of claim 1, wherein the secondary coil comprises a parallel inductor-capacitor (LC) circuit.

5. The method of claim 1, wherein the driving waveform further comprises data.

6. A tire pressure monitoring system of an aircraft, the tire pressure monitoring system comprising:
- a primary portion mounted to a non-rotating structure of the aircraft, the primary portion comprising:
  - a power supply configured to generate a carrier of a driving waveform;
  - a transmitter configured to generate a modulation of the driving waveform;
  - a controller configured to set a frequency of the carrier of the driving waveform;
  - a primary coil comprising a resonant circuit in electrical connection to the transmitter and the controller and configured to receive the driving waveform and generate an electromagnetic field; and
- a distributed sensing portion mounted to a wheel of the aircraft, the distributed sensing portion comprising:
  - a sensor capable of monitoring a parameter;
  - a secondary coil comprising a resonant circuit in electrical connection to the sensor and configured to be connected in inductive communication to the primary coil by the electromagnetic field; and
  - an effectivity monitor in physical and electrical connection to the secondary coil, wherein the effectivity monitor is configured to evaluate an efficiency of the inductive communication between the primary coil and the secondary coil;
- wherein the controller sets the frequency of the carrier of the driving waveform in correspondence to a resonant frequency of at least one of the primary coil and the secondary coil, wherein the resonant frequency is dependent upon variations in a distance between the primary portion and the distributed sensing portion in response to varying mechanical load on at least one of the non-rotating structure and the wheel.

7. The tire pressure monitoring system according to claim 6, wherein the sensor communicates sensed data to the secondary coil, whereby the sensed data is communicated to the controller by the primary coil connected in inductive communication to the secondary coil.

8. The tire pressure monitoring system according to claim 6, wherein the effectivity monitor comprises a sense resistor connected in physical and electrical communication to the secondary coil, whereby the controller may monitor at least one of a voltage and a current in the secondary coil to determine the resonant frequency of at least one of the primary coil and the secondary coil.

9. The tire pressure monitoring system according to claim 8, the effectivity monitor comprising a voltage sensor configured to determine a potential difference across at least a portion of the secondary coil to determine the resonant frequency of at least one of the primary coil and the secondary coil.

10. The tire pressure monitoring system according to claim 9, wherein the voltage sensor comprises a resistor.

11. The tire pressure monitoring system according to claim 6, wherein the primary coil comprising a resonant circuit comprises a parallel inductor-capacitor (LC) circuit.

12. The tire pressure monitoring system according to claim 6, wherein the secondary coil comprising a resonant circuit comprises a parallel inductor-capacitor (LC) circuit.

* * * * *